(12) United States Patent
Miao et al.

(10) Patent No.: US 10,408,103 B1
(45) Date of Patent: Sep. 10, 2019

(54) METHOD TO POWER MULTIPLE ELECTRIC HEATERS WITH A SINGLE POWER SOURCE

(71) Applicant: GM Global Technology Operations LLC, Detroit, MI (US)

(72) Inventors: Yong Miao, Ann Arbor, MI (US); Stefano Pellegrino, Villafranca D'Asti (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/972,572

(22) Filed: May 7, 2018

(51) Int. Cl.
| | | |
|---|---|---|
| *F01N 3/10* | (2006.01) | |
| *F01N 3/20* | (2006.01) | |
| *F01N 13/00* | (2010.01) | |
| *B01D 53/94* | (2006.01) | |

(52) U.S. Cl.
CPC .......... *F01N 3/2013* (2013.01); *B01D 53/944* (2013.01); *B01D 53/9418* (2013.01); *B01D 53/9477* (2013.01); *B01D 53/9495* (2013.01); *F01N 3/103* (2013.01); *F01N 3/2066* (2013.01); *F01N 13/009* (2014.06); *B01D 2255/102* (2013.01); *B01D 2255/2092* (2013.01); *B01D 2255/20738* (2013.01); *B01D 2255/20784* (2013.01); *B01D 2255/915* (2013.01); *F01N 2900/08* (2013.01); *F01N 2900/1602* (2013.01)

(58) Field of Classification Search
CPC ............ B01D 53/9418; B01D 53/9431; B01D 53/944; B01D 53/9477; B01D 2258/01; B01D 2258/012; F01N 3/103; F01N 3/105; F01N 3/2006; F01N 3/2013; F01N 3/2066; F01N 13/009; F01N 2900/08; F01N 2240/16
See application file for complete search history.

(56) References Cited

U.S. PATENT DOCUMENTS

| | | | |
|---|---|---|---|
| 8,650,860 B2 | 2/2014 | Applegate et al. | |
| 8,883,102 B1 | 11/2014 | Lambert et al. | |
| 9,856,774 B2 | 1/2018 | Di Perna et al. | |
| 10,273,846 B2 * | 4/2019 | Baensch | ................... F01N 3/28 |
| 2011/0016848 A1 * | 1/2011 | Brooks | ................. F01N 3/0231 60/274 |
| 2011/0023461 A1 * | 2/2011 | Strots | .................... F01N 3/2066 60/286 |

* cited by examiner

Primary Examiner — Timothy C Vanoy
(74) Attorney, Agent, or Firm — Quinn IP Law

(57) ABSTRACT

A engine exhaust system includes a diesel oxidation catalyst (DOC) configured to receive the engine exhaust gases, a first electric heater coupled to the DOC, and a selective catalytic reduction (SCR) device in fluid communication with the DOC. The engine exhaust system further includes a second electric heater coupled to the DOC, a power switch controller in electronic communication with the first electric heater and the second electric heater, and a single power source electrically coupled to the power switch controller, the first electric heater, and the second electric heater. The power switch controller includes a switch to control a power distribution between the first electric heater and the second electric heater as a function of time.

20 Claims, 2 Drawing Sheets

METHOD TO POWER MULTIPLE ELECTRIC HEATERS WITH A SINGLE POWER SOURCE

INTRODUCTION

The present disclosure relates to a method for powering multiple electric heaters of a engine exhaust system with a single power source.

It is desirable to control emission during the operation of a diesel engine. To do so, engine exhaust systems include aftertreatment components to minimize emissions of nitrogen oxides (NOx) and hydrocarbons.

SUMMARY

It is useful to heat some aftertreatment components, such as a diesel oxidation catalyst (DOC), a selective catalytic reduction (SCR), a diesel particulate filter (DPF), or a gasoline particulate filter (GPF), to maximize their efficiency. However, heating the aftertreatment components may require electrical power from multiple power sources (e.g., batteries). Accordingly, it is desirable to reduce the number of power sources (and thereferore reduce hardward cost) by powering multiple electric heaters in an engine exhaust system with a single power source (e.g., a single battery). It is feasible to use a single power source in an engine exhaust system, because electrical heating requests at different locations may occur at different times. For example, peak power requirements solely last a short time period after an engine cold-start. After the engine cold-start, the aftertreatment components may require a relatively small amount of power to maintain a desired temperature range. To prevent overheating, the electric heaters usually have a frequent on/off cycle. Heating (i.e., power on/off) time may be more conveniently and accurately controlled than regulating the power input (i.e., electrical input) to meet certain power input requirements. Thus, by changing the power-on time ratio among different electrical heaters, the desired power distribution among multiple electrical heaters can be achieved.

In some embodiments, a engine exhaust system includes a diesel oxidation catalyst (DOC) configured to receive the engine exhaust gases, a first electric heater coupled to the DOC such that the first electric heater is configured to heat the DOC, and a selective catalytic reduction (SCR) device in fluid communication with the DOC. The SCR device is downstream of the DOC such that the SCR device is positioned to receive the exhaust gases exiting the DOC. The engine exhaust system further includes a second electric heater coupled to the DOC such that the second electric heater is configured to heat the SCR device, a power switch controller in electronic communication with the first electric heater and the second electric heater, and a single power source electrically coupled to the power switch controller, the first electric heater, and the second electric heater such that the single power source is configured to supply an electrical current to the first electric heater, the power switch controller, and the second electric heater. The power switch controller includes a switch to control a power distribution between the first electric heater and the second electric heater as a function of time. The power switch controller may be programmed to determine whether the DOC is ready to be heated based on a temperature of the DOC.

The power switch controller is programmed to determine that the DOC is ready to be heated in response to determining that the temperature of the DOC is within a first predetermined temperature range. The power switch controller may be programmed to determine that the SCR is ready to be heated based on a temperature of the SCR device. The power switch controller may be programmed to determine that the SCR is ready to be heated in response to determining that the temperature of the SCR device is within a second predetermined temperature range, and the second predetermined temperature range is different from the first predetermined temperature range. The power switch controller may be programmed to determine an engine speed of a diesel engine, an engine load of the diesel engine, and an energy level of the single power source, and the single power source is a battery. The power switch controller may be programmed to control the switch to pulse electrical power between the first electric heater and the second electric heater in response to determining that the DOC is ready to be heated, the SCR device is ready to be heated, the engine speed of the diesel engine is greater than a predetermined speed threshold, the engine load of the diesel engine is greater than a predetermined load threshold, and the energy level of the single power source is greater than a predetermined level threshold. The power switch controller may be programmed to control the switch to pulse the electrical power between the first electric heater and the second electric heater by adjusting a power-on time ratio between the first electric heater and the second electric heater, and the power-on time ratio between the first electric heater and the second electric heater is defined as an amount of time that the first electric heater is turned on divided by an amount of time that the second electric heater is turned on. The power switch controller may be programmed to control the switch to pulse the electrical power between the first electric heater and the second electric heater such that first electric heater is off solely when the second electric heater is on, and the second electric heater is off solely when the first electric heater is on. The power switch controller may be programmed to turn off the first electric heater in response to determining that the DOC is not ready to be heated, and the power switch controller is programmed to turn off the second electric heater in response to determining that the SCR is not ready to be heated.

The present disclosure also describes a vehicle including a diesel engine including an engine exhaust outlet and a engine exhaust system (as described above) in fluid communication with the diesel engine exhaust outlet such that the diesel engine is configured to receive exhaust gases from the diesel engine.

The present disclosure also describes a method of controlling a engine exhaust system including: (a) determining that a diesel oxidation catalyst (DOC) is ready to be heated based on a temperature of the DOC, wherein a first electric heater is coupled to the DOC to heat the DOC; (b) determining that a selective catalytic reduction (SCR) device is ready to be heated based on a temperature of the SCR device, wherein a second electric heater is coupled to the SCR device to heat the SCR device; and (c) controlling, a power switch controller, a switch to pulse electrical power between the first electric heater and the second electric heater in response to determining that the DOC is ready to be heated, the SCR device is ready to be heated, an engine speed of a diesel engine is greater than a predetermined speed threshold, an engine load of the diesel engine is greater than a predetermined load threshold, and an energy level of a single power source is greater than a predetermined level threshold, wherein the single power source is electrically coupled to both the first electric heater and the second electric heater.

The above features and advantages and other features and advantages of the present teachings are readily apparent from the following detailed description of the best modes for carrying out the teachings when taken in connection with the accompanying drawings.

DETAILED DESCRIPTION

Figure 1:
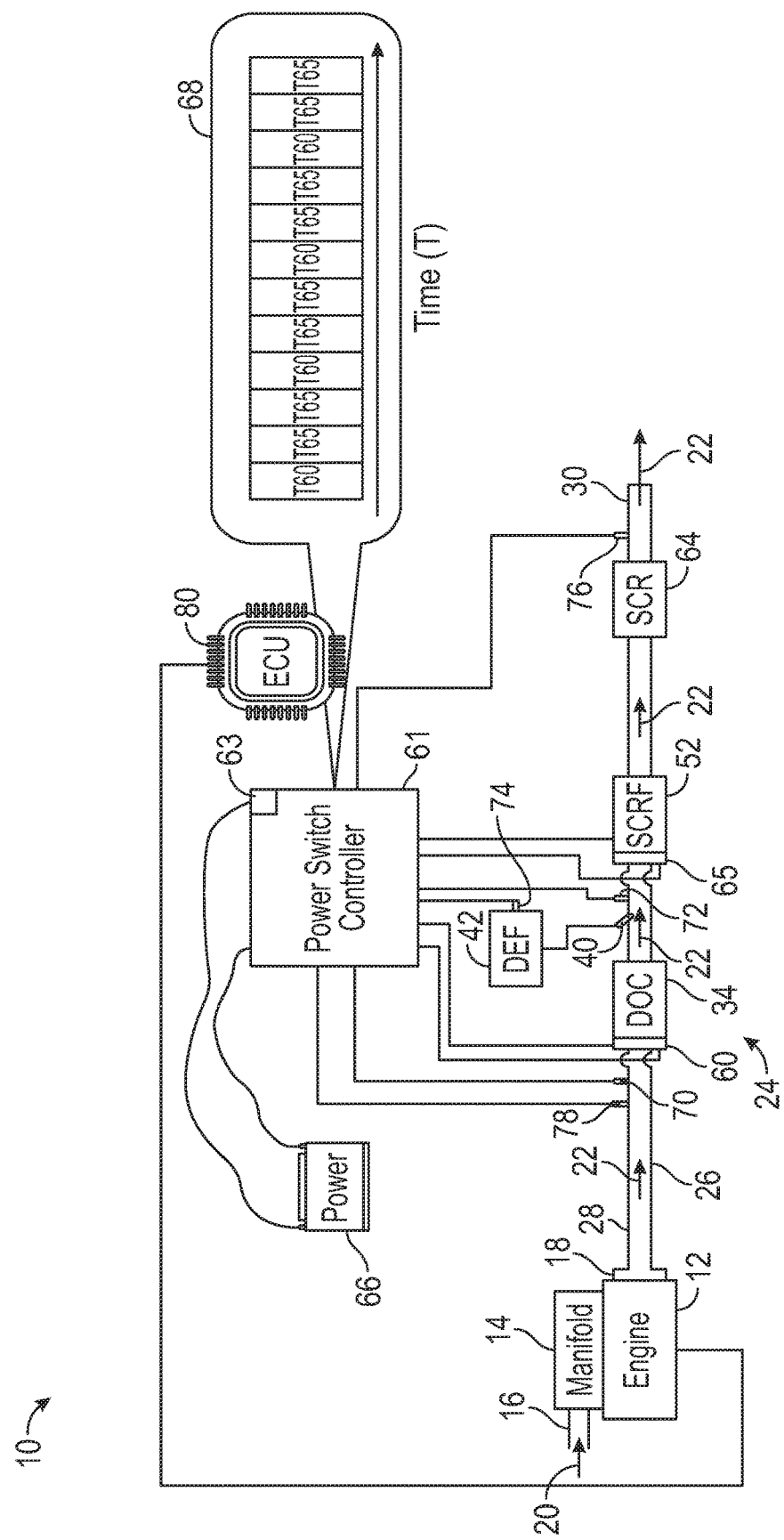
FIG. 1 is a schematic diagram of a vehicle including a diesel engine and a engine exhaust system.

Referring to the drawings, wherein like reference numbers correspond to like or similar components throughout the several figures, FIG. 1 shows a portion of a vehicle 10 including a internal combustion engine 12, such as a diesel engine or a gasoline engine. The internal combustion engine 12 has a manifold 14 with an air inlet 16. Fresh air 20 received through the air inlet 16 is combusted in the internal combustion engine 12. The internal combustion engine 12 also includes an engine exhaust outlet 18. After combustion in the internal combustion engine 12, exhaust gases 22 exit the internal combustion engine 12 through the engine exhaust outlet 18. The vehicle 10 further includes a engine exhaust system 24 in fluid communication with the internal combustion engine 12 through the engine exhaust outlet 18. As such, during operation, the exhaust gases 22 flow from the internal combustion engine 12 to the diesel engine exhaust gas system 24. Specifically, the diesel engine exhaust gas system 24 includes an exhaust pipe assembly 26. The exhaust pipe assembly 26 includes an assembly inlet 28 configured to receive the engine exhaust gases 22 from the internal combustion engine 12 through the engine exhaust outlet 18. In addition, the exhaust pipe assembly 26 includes pipe segments and an assembly outlet 30 that allows the exhaust gases 22 to exit the diesel engine exhaust gas system 24.

With continued reference to FIG. 1, the engine exhaust system 24 includes a diesel oxidation catalyst (DOC) 34 that is disposed downstream in the flow of exhaust gases 22 from the assembly inlet 28 and the internal combustion engine 12. In the present disclosure, the term "diesel oxidation catalyst (DOC)" means an aftertreatment component that is designed to convert carbon monoxide (CO) and hydrocarbons into carbon dioxide ($CO_2$) and water. In the depicted embodiment, the DOC 34 is a flow-through device that includes a housing (as a canister) that contains a substrate (which may be a honeycomb structure). The substrate in the DOC 34 may be coated with an active catalyst material. For example, the active catalyst material may include platinum group materials. The DOC 34 treats the exhaust gases 22 to reduce nitric oxide (NO), carbon monoxide (CO), and/or hydrocarbons (HC) in the exhaust gases 22. The DOC 34 converts a percentage of the nitrogen oxides (NOx) in the exhaust gases 22 into nitrogen ($N_2$) and carbon dioxide ($CO_2$) or water ($H_2O$), oxidizes a percentage of carbon monoxide (CO) to carbon dioxide ($CO_2$), oxidizes a percentage of unburnt hydrocarbons (HC) to carbon dioxide ($CO_2$) and water ($H_2O$), and oxidizes nitric oxide (NO) into nitrogen dioxide ($NO_2$).

The DOC 34 is upstream in the flow of exhaust gases 22 of a diesel exhaust fluid (DEF) injector 40 that is disposed in an exhaust pipe segment of the exhaust pipe assembly 26. The DEF injector 40 receives DEF from a DEF source 42 and injects the DEF directly into the flow of the exhaust gases 22. The DEF source 42 may be a tank with DEF. The DEF may be, but is not limited to, a mixture of urea and water. Alternatively, the DEF may be anhydrous ammonia or aqueous ammonia. When heated by the exhaust gases 22, the aqueous urea vaporizes and decomposes to form ammonia ($NH_3$) and carbon dioxide ($CO_2$). The DEF injector 40 injects the DEF immediately upstream of an exhaust mixer (not shown) in the flow of exhaust gases 22. This exhaust mixer mixes the injected DEF with the exhaust gases 22.

The engine exhaust system 24 further includes a first selective catalytic reduction (SCR) device 52. The first SCR device 52 includes a substrate with a metallic catalyst. The substrate may be a honeycomb structure. The surfaces of the substrate of the first SCR device 52 may be coated with the metallic catalyst. As a non-limiting example, the metallic catalyst may be a stainless steel with a high operating temperature and a long service life. For example, this metallic catalyst may be an iron-chromium-aluminum (FeCrAl) foil. The first SCR device 52 is downstream of the DOC 34. As such, the first SCR 52 is configured to receive the exhaust gases 22 exiting from the DOC 34. The first SCR device 52 may be configured as a selective catalyst reduction filter (SCRF). The SCRF has a substrate that is a filter with a selective reduction catalyst coated on the filter.

The engine exhaust system 24 further includes a second SCR device 64 positioned downstream in the flow of the exhaust gases 22 from the first SCR device 52 and upstream from the assembly outlet 30. The second SCR device 64 includes a substrate with a metallic catalyst. The substrate may be a honeycomb structure. The surfaces of the substrate of the second SCR device 64 may be coated with the metallic catalyst. As a non-limiting example, the metallic catalyst may be a stainless steel with a high operating temperature and a long service life. For example, this metallic catalyst may be an iron-chromium-aluminum (FeCrAl) foil.

The engine exhaust system 24 includes a first electric heater 60 directly coupled to the DOC 34. As such, the first electric heater 60 is configured to heat the DOC. Specifically, the first electric heater 60 is configured to heat the metallic catalyst of the DOC. It is envisioned that the first electric heater 60 may be housed in the same housing as the DOC 34. Energizing of the first electric heater 60 may be controlled by a power switch controller 61 that controls one or more switches 63 based on sensed temperature and other engine operating parameters. Because the DOC 34 includes a metallic catalyst, this metallic catalyst rapidly heats to increase the efficiency of the first SCR device 52, even when the exhaust gas temperature is relatively low, such as after an engine cold start. In the present disclosure, the term "cold engine start" means a start of the internal combustion engine 12 after the internal combustion engine 12 has been off for a predetermined amount of time, with the vehicle 10 not in use. The engine exhaust system 24 further includes a second SCR device 64 positioned downstream in the flow of the exhaust gases 22 from the first SCR device 52 and upstream of the assembly outlet 30. The engine exhaust system 24 further includes a second electric heater 65 directly coupled to the first SCR device 52. As such, the second electric heater 52 is configured to heat the first SCR device 52. Specifically, the second electric heater 65 is configured to heat the metallic catalyst of the first SCR device 52. It is envisioned that the second electric heater 65 may be housed in the same housing as the first SCR 52. Energizing of the second electric heater 65 may be controlled by the power switch controller 61 that controls one or more switches 63 based on sensed temperature and other engine operating parameters. Because the first SCR device 52 includes a metallic catalyst, this metallic catalyst rapidly heats to increase the efficiency of the first SCR device 52, even when the exhaust gas temperature is relatively low, such as after an engine cold start. Although the figures illustrate the first electric heater 60 and the second electric heater 65, the engine exhaust system 24 may include more than two electric heaters.

The engine exhaust system 24 includes the power switch controller 61 and a single power source 66, such as a battery. In the present disclosure, the term "power source" means a device, such as a battery, that is capable of providing electrical powers to other components, such as the first electric heater 60 and the second electric heater 65. The power switch controller 61 is coupled to (e.g., in electronic communication with) the single power source 66. As such, the power switch controller 61 is configured to control the power distribution to both the first electric heater 60 and the second electric heater 65. Controller, control module, module, control, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality, including data storage and data analysis. Software, firmware, programs, instructions, control routines, code, algorithms and similar terms mean any controller-executable instruction sets including calibrations and look-up tables. Communications between controllers and communications between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. The power switch controller 61 is in electronic communication with the first electric heater 60 and the second electric heater 65 in order to control the supply of electrical power to the first electric heater 60 and the second electric heater 65. The single power source 66 (e.g., battery) is in electronic communication with the power switch controller 61. Therefore, the power switch controller 61 is programmed to determine the energy level of the single power source 66 based on a signal received from the single power source 66.

The single power source 66 is electrically coupled to the power switch controller 61, the first electric heater 60, and the second electric heater 65. As such, the single power source 66 is configured to supply an electrical current to the first electric heater 60, the power switch controller 61, and the second electric heater 65. No other power source provides electrical current to the first electric heater 60 and the second electric heater 65. The power switch controller 61 is configured to control the switch 63 to adjust the power distribution between the first electric heater 60 and the second electric heater 65 as a function of time T as schematically illustrated in the box 68. The box 68 illustrates how the power switch controller 61 turns on the first electric heater 60 (while simultaneously turning off the second electric heater 65) and then, at a different time, it turns on the second electric heater 65 while simultaneously turning off the first electric heater 60. The first boxes T60 represent discrete periods of time in which the first electric heater 60 is on while simultaneously the second electric heater 65 is off. The second boxes T65 represent discrete periods of time in which the second electric heater 65 is on while simultaneously the first electric heater 60 is off. By actuating the switch 63, the power switch controller 61 is capable of controlling the electrical power distribution between the first electric heater 60 and the second electric heater 65. Specifically, the power switch controller 61 controls the operation of the switch 63 in order to control the power distribution between the first electric heater 60 and the second electric heater 65 as a function of time T.

The engine exhaust system 24 includes a first temperature sensor 70 configured to determine (or at least estimate) the temperature of the DOC 34. Accordingly, the first temperature sensor 70 may be directly or indirectly coupled to the DOC 34. In the depicted embodiment, the first temperature sensor 70 is directly coupled to an exhaust pipe segment of the exhaust pipe assembly 26 that is upstream of the DOC 34. The first temperature sensor 70 may indirectly determine the temperature of the DOC 34 by measuring the temperature of the exhaust gases 22 upstream of the DOC 34 and downstream of the engine 12. The first temperature sensor 70 is in electronic communication with the power switch controller 61. Therefore, the power switch controller 61 is configured to determine the temperature of the DOC 34 based on signal received from the first temperature sensor 70. The engine exhaust system 24 may additionally include a second temperature sensor 72 configured to determine (or at least estimate) the temperature of the first SCR device 52. Accordingly, the second temperature sensor 72 may be directly or indirectly coupled to the first SCR device 52. In the depicted embodiment, the second temperature sensor 72 is directly coupled to an exhaust pipe segment of the exhaust pipe assembly 26 that is downstream of the DOC 34 and upstream of the first SCR device 52. The second temperature sensor 72 may indirectly determine the temperature of the first SCR device 52 by measuring the temperature of the exhaust gases 22 upstream of the first SCR device 52 and downstream of the DOC 34. The second temperature sensor 72 is in electronic communication with the power switch controller 61. Therefore, the power switch controller 61 is configured to determine the temperature of the first SCR device 52 based on the signal received from the second temperature sensor 72, The engine exhaust system 24 may further include a DEF storage sensor 74 coupled to the DEF source 42 to measure the amount of DEF stored in the DEF source 42. The DEF storage sensor 74 may include, for example, a buoyant lever that detects when the DEF storage level is less than a predetermined level threshold. The DEF storage sensor 74 is in electronic communication with the power switch controller 61. Accordingly, the power switch controller 61 is configured to determine the amount of DEF stored in the DEF source 42 (i.e., the DEF storage level) based on a signal received from the DEF storage sensor 74.

The engine exhaust system 24 may include a nitrogen oxides (NOx) sensor 76 configured to measure the concentration of NOx in the exhaust gases 22. The NOx sensor may be directly coupled to an exhaust pipe segment of the exhaust pipe assembly 26. For example, the NOx sensor 76 may be coupled to an exhaust pipe segment of the exhaust pipe assembly 26 that is downstream of the second SCR device 64. The NOx sensor 76 is in electric communication with the power switch controller 61. Accordingly, the power switch controller 61 is configured to determine the NOx concentration in the exhaust gases 22 based on a signal received from the NOx sensor 76.

The diesel exhaust engine system 24 may further include an exhaust gas oxygen sensor (UEGO) 78 configured to measure the oxygen concentration in the exhaust gases 22. The UEGO 78 may be directly coupled to an exhaust pipe segment of the exhaust pipe assembly 26 that is upstream of the DOC 34 in order to measure the oxygen concentration of the exhaust gases 22 flowing upstream of the DOC 34. The power switch controller 61 is in electronic communication with the UEGO 78. Accordingly, the power switch controller 61 is configured to determine the oxygen concentration of the exhaust gases 22 based on a signal from the UEGO 78. Further, the power switch controller 61 is programmed to determine the carbon monoxide (CO) concentration and the hydrocarbons (HC) concentration in the exhaust gases 22 flowing upstream of the DOC 34 based on the measured oxygen concentration and a predetermined fuel map.

The vehicle 10 further includes an engine control unit (ECU) 80 in electronic communication with the power switch controller 61 and the internal combustion engine 12. The ECU 80 is programmed to control the internal combustion engine 12. Further, the ECU 80 is programmed to determine the engine load and the engine speed based on signals received from the internal combustion engine 12. In addition, the ECU 80 is programmed to communicate the engine speed and engine load to the power switch controller 61. Thus, the power switch controller 61 is programmed to determine the engine speed and the engine load of the internal combustion engine 12 based on signals received from the ECU 80. In addition to time, the adjustment of the power distribution between the first electric heater 60 and the second electric heater 65 may be based on the heating requirements communicated to the power switch controller 61 by the ECU 80. The ECU 80 may determine these heating requirements based on engine operating conditions, such as engine load and engine speed.

Figure 2:
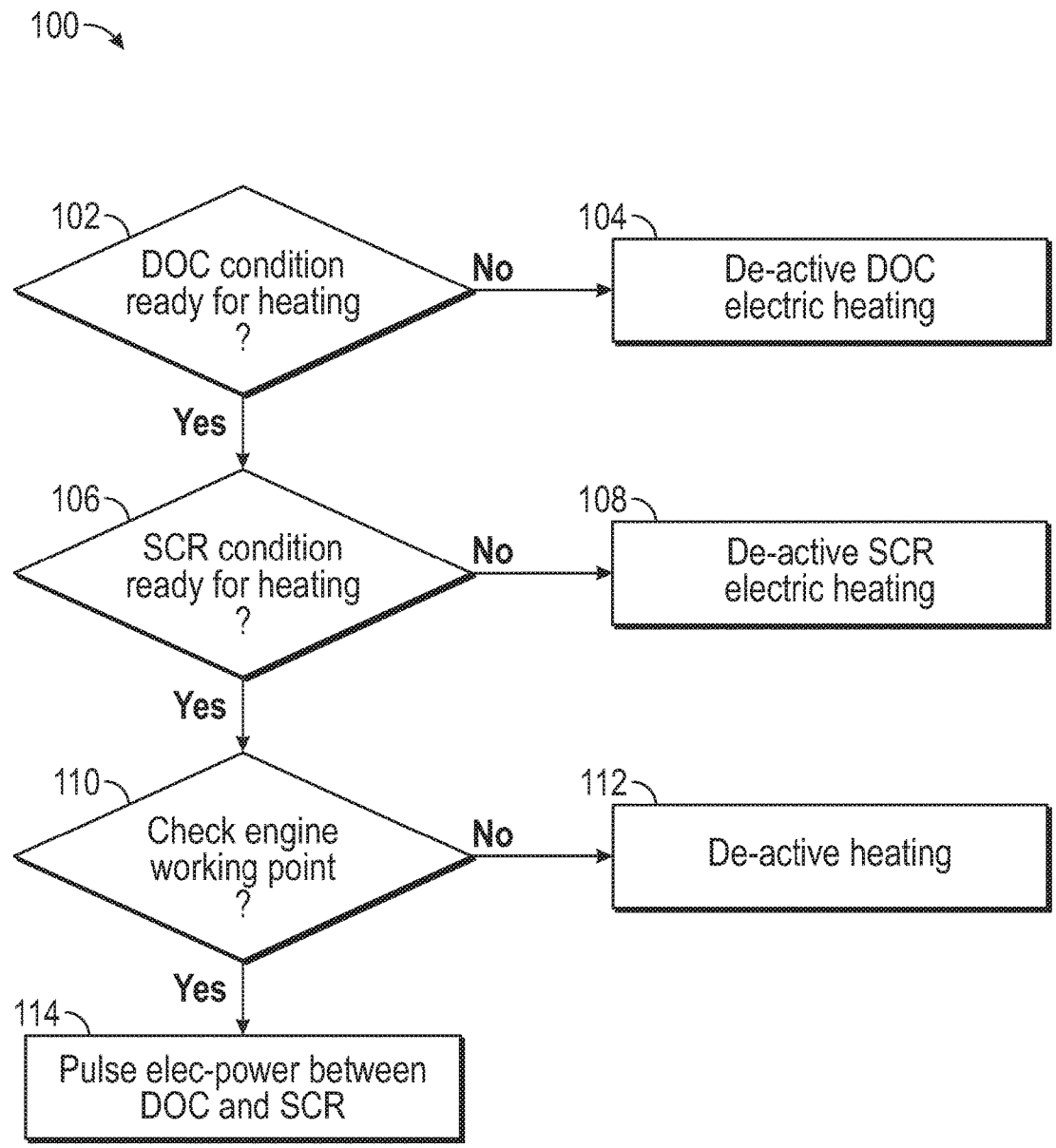
FIG. 2 is a flowchart of a method for powering multiple electric heaters with a single power source.

FIG. 2 is a flowchart of a method 100 for controlling the first electric heater 60 and the second electric heater 65 with the single power source 66. The power switch controller 61 is specifically programmed to execute the method 100. The method 100 begins at block 102, which entails determining whether the DOC 34 is ready to be heated based on the temperature of DOC 34, the CO concentration in the exhaust gases 22 entering the DOC 34, and/or the HC concentration in the exhaust gases 22 entering the DOC 34. At block 102, the power switch controller 61 determines the temperature of the DOC 34 based, for example, on the signal received from the first temperature sensor 70. Further, at this juncture, the power switch controller 61 may determine the CO concentration in the exhaust gases 22 entering the DOC 34 based on oxygen concentration measured by the UEGO 78 and the predetermined fuel map stored on the power switch controller 61. Also, at block 102, the power switch controller 61 may determine the HC concentration in the exhaust gases 22 entering the DOC 34. At block 102, the power switch controller 61 may determine that the DOC 34 is ready to be heated in response to determining: (a) that the temperature of the DOC 34 is within a first predetermined temperature range; (b) that the CO concentration of the exhaust gases 22 entering the DOC 34 is greater than a predetermined CO threshold; and/or (c) that the HC concentration of the exhaust gases 22 entering the DOC 34 is greater than a predetermined HC threshold. If the DOC 34 is not ready to be heated, then the method 100 proceeds to block 104. At block 104, the power switch controller 61 deactivates the first electric heater 60 in response to determining that the DOC 34 is not ready to be heated. If the DOC 34 is ready to be heated, then the method 100 proceeds to block 106.

At block 106, the power switch controller 61 determines whether the first SCR device 52 is ready to be heated based on the temperature of the first SCR device 52, the concentration of NOx in the exhaust gases 22, and/or the DEF storage level in the DEF source 42. At this juncture, the power switch controller 61 determines the temperature of the first SCR device 52 based, for example, on the signal received from the second temperature sensor 72. Further, at block 106, the power switch controller 61 determines the NOx concentration in the exhaust gases 22 based, for example, on the signal received from NOx sensor 76. In addition, at block 106, the power switch controller 61 determines that DEF storage level in the DEF source 42 based, for example, on the signal received from the DEF storage sensor 74. The power switch controller 61 determines that the first SCR device 52 is ready to be heated in response to determining: (a) that the temperature of the first SCR device 52 is within a second predetermined temperature range; (b) that the NOx concentration in the exhaust gases 22 is greater than a predetermined NOx threshold; and/or (c) that the DEF storage level in the DEF source 42 (i.e., the amount of DEF stored in the DEF source 42) is greater than a predetermined DEF threshold. The second predetermined temperature range is different from the first predetermined temperature range. If the first SCR device 52 is not ready to be heated, then the method 100 proceeds to block 108. At block 108, the power switch controller 61 deactivates the second electric heater 52 in response to determining that the first SCR device 65 is not ready to be heated. If the first SCR device 52 is ready to be heated, then the method 100 proceeds to block 110.

At block 110, the power switch controller 61 checks the engine working point. Specifically, the power switch controller 61 determines the engine speed of the internal combustion engine 12, the engine load of the internal combustion engine 12, and/or the energy level of the single power source 66. As discussed above, the power switch controller 61 is programmed to determine the engine speed and the engine load from signals received from the ECU 80. Further, the power switch controller 61 is programmed to determine the energy level of the single power source 66 based on a signal received from the single power source 66. If the engine speed of the internal combustion engine 12 is not greater than a predetermined speed threshold, the engine load of the internal combustion engine 12 is not greater than a predetermined load threshold, and/or the energy level of the single power source 66 is not greater than a predetermined level threshold, then the method 100 proceeds to block 112. At block 112, the power switch controller 61 deactivates both the first electric heater 60 and the second electric heater 65 in response to determining: (a) that the engine speed of the internal combustion engine 12 is not greater than a predetermined speed threshold; (b) the engine load of the internal combustion engine 12 is not greater than a predetermined load threshold; and/or (c) the energy level of the single power source 66 is not greater than a predetermined level threshold. If the engine speed of the internal combustion engine 12 is greater than the predetermined speed threshold, the engine load of the internal combustion engine 12 is greater than the predetermined load threshold, and/or the energy level of the single power source 66 is greater than the predetermined level threshold, then the method 100 proceeds to block 114.

At block 114, the power switch controller 61 controls the switch 63 to pulse electrical power between the first electric heater 60 and the second electric heater 65 in response to determining that the DOC 34 is ready to be heated, the first SCR device 52 is ready to be heated, the engine speed of the diesel engine is greater than the predetermined speed threshold, the engine load of the diesel engine the greater than the predetermined load threshold, and the energy level of the single power source is greater than the predetermined level threshold. To pulse the electrical power between the first electric heater 60 and the second electric heater 65, the power switch controller 61 adjusts a power-on time ratio between the first electric heater 60 and the second electric heater 65. In the present disclosure, the term "the power-on time ratio between the first electric heater 60 and the second electric heater 65" means as an amount of time that the first electric heater 60 is turned on divided by an amount of time that the second electric heater 65 is turned ON. It is envisioned that, at least in some instances, the first electric heater 60 may be turned on solely when the second electric heater 65 is turned off. Likewise, in some instances, the second electric heater 65 is turned on solely when the first electric heater 60 is turned off. By using the method 100, the heating time (e.g., power on/off time) of the first electric heater 60 and the second electric heater 65 is more conveniently and accurately controlled than regulationing the power input (i.e., electric current) to meet certain power input requirement. By changing the power-on time ratio among the first electric heater 60 and the second electric heater 65, the desired power distribution is achieved. By using the method 100, the total hydrocarbon (THC) and NOx emission can be lowered with the same amount of energy consumption when compared to a system that has two power sources. Also, by using the method 100, lower energy consumption is achieved with the same emission performance when compared to a system that has two power sources. The adjustment of the the power-on time ratio between the first electric heater 60 and the second electric heater 65 may be based on the heating requirements (i.e., power requests) communicated to the power switch controller 61 by the ECU 80. The ECU 80 may determine these heating requirements based on engine operating conditions, such as engine load and engine speed.

While the best modes for carrying out the teachings have been described in detail, those familiar with the art to which this disclosure relates will recognize various alternative designs and embodiments for practicing the teachings within the scope of the appended claims. The engine exhaust system 24 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings.

The invention claimed is:

1. An engine exhaust system, comprising:
a diesel oxidation catalyst (DOC) configured to receive engine exhaust gases;
an first electric heater coupled to the DOC such that the first electric heater is configured to heat the DOC;
a selective catalytic reduction (SCR) device in fluid communication with the DOC, wherein the SCR device is downstream of the DOC such that the SCR device is positioned to receive the engine exhaust gases exiting the DOC;
a second electric heater coupled to the DOC such that the second electric heater is configured to heat the SCR device;
a power switch controller in electronic communication with the first electric heater and the second electric heater;
a single power source electrically coupled to the power switch controller, the first electric heater, and the second electric heater such that the single power source is configured to supply an electrical current to the first electric heater, the power switch controller, and the second electric heater; and
wherein the power switch controller includes a switch to control a power distribution between the first electric heater and the second electric heater as a function of time.

2. The engine exhaust system of claim 1, wherein the power switch controller is programmed to determine whether the DOC is ready to be heated based on a temperature of the DOC.

3. The engine exhaust system of claim 2, wherein the power switch controller is programmed to determine that the DOC is ready to be heated in response to determining that the temperature of the DOC is within a first predetermined temperature range.

4. The engine exhaust system of claim 3, wherein the power switch controller is programmed to determine that the SCR is ready to be heated based on a temperature of the SCR device.

5. The engine exhaust system of claim 4, wherein the power switch controller is programmed to determine that the SCR is ready to be heated in response to determining that the temperature of the SCR device is within a second predetermined temperature range, and the second predetermined temperature range is different from the first predetermined temperature range.

6. The engine exhaust system of claim 5, wherein the power switch controller is programmed to determine an engine speed of a diesel engine, an engine load of the diesel engine, and an energy level of the single power source, and the single power source is a battery.

7. The engine exhaust system of claim 6, wherein the power switch controller is programmed to control the switch to pulse electrical power between the first electric heater and the second electric heater in response to determining that the DOC is ready to be heated, the SCR device is ready to be heated, the engine speed of the diesel engine is greater than a predetermined speed threshold, the engine load of the diesel engine is greater than a predetermined load threshold, and the energy level of the single power source is greater than a predetermined level threshold.

8. The engine exhaust system of claim 7, wherein the power switch controller is programmed to control the switch to pulse the electrical power between the first electric heater and the second electric heater by adjusting a power-on time ratio between the first electric heater and the second electric heater, and the power-on time ratio between the first electric heater and the second electric heater is defined as an amount of time that the first electric heater is turned on divided by an amount of time that the second electric heater is turned on.

9. The engine exhaust system of claim 8, wherein the power switch controller is programmed to control the switch to pulse the electrical power between the first electric heater and the second electric heater such that first electric heater is off solely when the second electric heater is on, and the second electric heater is off solely when the first electric heater is on.

10. The engine exhaust system of claim 1, wherein the power switch controller is programmed to turn off the first electric heater in response to determining that the DOC is not ready to be heated, and the power switch controller is programmed to turn off the second electric heater in response to determining that the SCR is not ready to be heated.

11. A vehicle, comprising:
a diesel engine including an engine exhaust outlet;
an engine exhaust system in fluid communication with the engine exhaust outlet such that the diesel engine is configured to receive engine exhaust gases from the diesel engine, wherein the engine exhaust system includes:
a diesel oxidation catalyst (DOC) in fluid communication with the diesel engine such that the DOC is configured to receive the engine exhaust gases;
a first electric heater coupled to the DOC such that the first electric heater is configured to heat the DOC;
a selective catalytic reduction (SCR) device in fluid communication with the DOC such that the SCR device is positioned to receive the engine exhaust gases exiting the DOC;
a second electric heater coupled to the DOC such that the second electric heater is configured to heat the SCR device;
a power switch controller in electronic communication with the first electric heater and the second electric heater;
a single power source electrically coupled to the power switch controller, the first electric heater, and the second electric heater such that the single power source is configured to supply an electrical current to the first electric heater, the power switch controller, and the second electric heater; and
wherein the power switch controller includes a switch to control a power distribution between the first electric heater and the second electric heater as a function of time.

12. The vehicle of claim 11, wherein the power switch controller is programmed to determine whether the DOC is ready to be heated based on a temperature of the DOC.

13. The vehicle of claim 12, wherein the power switch controller is programmed to determine that the DOC is ready to be heated in response to determining that the temperature of the DOC is within a first predetermined temperature range.

14. The vehicle of claim 13, wherein the power switch controller is programmed to determine that the SCR device is ready to be heated based on a temperature of the SCR device.

15. The vehicle of claim 14, wherein the power switch controller is programmed to determine that the SCR is ready to be heated in response to determining that the temperature of the SCR device is within a second predetermined temperature range, and the second predetermined temperature range is different from the first predetermined temperature range.

16. The vehicle of claim 15, wherein the power switch controller is programmed to determine an engine speed of a diesel engine, an engine load of the diesel engine, and an energy level of the single power source, and the single power source is a battery.

17. The vehicle of claim 16, wherein the power switch controller is programmed to control the switch to pulse electrical power between the first electric heater and the second electric heater in response to determining that the DOC is ready to be heated, the SCR device is ready to be heated, the engine speed of the diesel engine is greater than a predetermined speed threshold, the engine load of the diesel engine is greater than a predetermined load threshold, and the energy level of the single power source is greater than a predetermined level threshold.

18. The vehicle of claim 17, wherein the power switch controller is programmed to control the switch to pulse the electrical power between the first electric heater and the second electric heater by adjusting a power-on time ratio between the first electric heater and the second electric heater, and the power-on time ratio between the first electric heater and the second electric heater is defined as an amount of time that the first electric heater is on divided by an amount of time that the second electric heater is on.

19. The vehicle of claim 11, wherein:
the power switch controller is programmed to determine whether the DOC is ready to be heated based on a temperature of the DOC;
the power switch controller is programmed to determine a carbon monoxide (CO) concentration in the engine exhaust gases;
the power switch controller is programmed to determine a hydrocarbons (HC) concentration in the engine exhaust gases;
the power switch controller is programmed to determine that the DOC is ready to be heated in response to determining that:
the temperature of the DOC is within a first predetermined temperature range;
the CO concentration of the engine exhaust gases is greater than a predetermined CO threshold; and
the HC concentration of the engine exhaust gases entering the DOC is greater than a predetermined HC threshold;
the power switch controller is programmed to determine that the SCR device is ready to be heated based on a temperature of the SCR device;
the power switch controller is programmed to determine a nitrogen oxides (NOx) concentration in the engine exhaust gases;
the power switch controller is programmed to determine an amount of diesel exhaust fluid (DEF) stored in a DEF source;
the power switch controller is programmed to determine that the SCR is ready to be heated in response to determining that:
the temperature of the SCR device is within a second predetermined temperature range, the second predetermined temperature range being different from the first predetermined temperature range;
the NOx concentration in the engine exhaust gases is greater than a predetermined NOx threshold; and
the amount of DEF stored in the DEF source is greater than a predetermined DEF threshold;
the power switch controller is programmed to determine an engine speed of the diesel engine;
the power switch controller is programmed to determine an engine load of the diesel engine;

the power switch controller is programmed to determine an energy level of the single power source, the single power source being a battery;

the power switch controller is programmed to control the switch to pulse electrical power between the first electric heater and the second electric heater in response to determining that:
the DOC is ready to be heated;
the SCR device is ready to be heated;
the engine speed of the diesel engine is greater than a predetermined speed threshold;
the engine load of the diesel engine is greater than a predetermined load threshold; and
the energy level of the single power source is greater than a predetermined level threshold;

the power switch controller is programmed to control the switch to pulse the electrical power between the first electric heater and the second electric heater by adjusting a power-on time ratio between the first electric heater and the second electric heater;

the power-on time ratio between the first electric heater and the second electric heater is defined as an amount of time that the first electric heater is on divided by an amount of time that the second electric heater is on; and the power switch controller is programmed to control the switch to pulse the electrical power between the first electric heater and the second electric heater such that first electric heater is off solely when the second electric heater is on, and the second electric heater is off solely when the first electric heater is on.

20. A method of controlling an engine exhaust system, comprising:
determining that a diesel oxidation catalyst (DOC) is ready to be heated based on a temperature of the DOC, wherein a first electric heater is coupled to the DOC to heat the DOC;
determining that a selective catalytic reduction (SCR) device is ready to be heated based on a temperature of the SCR device, wherein a second electric heater is coupled to the SCR device to heat the SCR device; and
controlling, via a power switch controller, a switch to pulse electrical power between the first electric heater and the second electric heater in response to determining that the DOC is ready to be heated, the SCR device is ready to be heated, an engine speed of a diesel engine is greater than a predetermined speed threshold, an engine load of the diesel engine is greater than a predetermined load threshold, and an energy level of a single power source is greater than a predetermined level threshold, wherein the single power source is electrically coupled to both the first electric heater and the second electric heater.

* * * * *